(12) United States Patent
Sakamoto et al.

(10) Patent No.: US 6,315,882 B1
(45) Date of Patent: Nov. 13, 2001

(54) BASIC CATIONIC ELECTRODEPOSITION COATING COMPOSITION AND METHOD FOR ITS PRODUCTION

(75) Inventors: Hiroyuki Sakamoto, Kobe; Ichiro Kawakami, Takatsuki; Takayuki Kokubun, Suita; Toshitaka Kawanami, Kawabe-gun; Takao Saito, Toyonaka, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/234,444

(22) Filed: Jan. 21, 1999

(30) Foreign Application Priority Data

Jan. 21, 1998 (JP) .................................................. 10-025026

(51) Int. Cl.⁷ ................................................... C25D 13/04
(52) U.S. Cl. ........................ 204/489; 204/501; 204/504; 204/506
(58) Field of Search ................................. 204/489, 506, 204/501, 504

(56) References Cited

U.S. PATENT DOCUMENTS 3,937,679  2/1976  Bosso et al. .................... 260/29.3

FOREIGN PATENT DOCUMENTS

| 0 107 101 A2 | 5/1984 | (EP) . |
| 2115496 | 7/1972 | (FR) . |
| 1 599 214 | 9/1981 | (GB) . |

*Primary Examiner*—Kishor Mayekar
(74) *Attorney, Agent, or Firm*—Connolly Bove Lodge & Hutz

(57) ABSTRACT

The present invention has for its object to provide a basic cationic electrodeposition coating composition with does not detract from either storage stability or bath stability even though it is basic and which does not make the coating equipment such as the electrodeposition tank and associated piping corroded, and a method for producing it. The present invention is directed to a basic cationic electrodeposition coating composition having a hydrogen ion concentration within the range of 7.5 to 12.0 in terms of hydrogen ion exponent (pH), and a method for producing it.

11 Claims, No Drawings

BASIC CATIONIC ELECTRODEPOSITION COATING COMPOSITION AND METHOD FOR ITS PRODUCTION

FIELD OF THE INVENTION

The present invention relates to a basic cationic electrodeposition coating composition with which cationic electrodeposition coating can be carried out under basic conditions and a methods for producing it.

PRIOR ART

Cationic electrodeposition coating permits coating of a substrate automatically and continuously without leaving any details uncoated even when the substrate has a complicated shape of surface and, therefore, has been used broadly in the undercoating of automotive bodies and other substrates having large and complicated shape of surfaces and demanding a high level of corrosion resistance. Moreover, since it is more economical than any other coating technique in the viewpoint of the application efficiency of coatings, cationic electrodeposition coating has found widespread application as an industrial method for coating.

In such cationic electrodeposition coating, the acid-neutralized aminoepoxy type electrodeposition coatings are most widely used. Generally, such acid-neutralized aminoepoxy electrodeposition coatings are composed generally of a polyamino resin prepared by reacting an epoxy group with an amine. or a resin available upon modifying said polyamino resin. However, since the tertiary amino groups of the resin have been neutralized with hydrogen ions (protons) by adding an organic acid such as formic acid, acetic acid, lactic acid, or the like in order to obtain a stable dispersion of the resin in water, the hydrogen ion exponent (pH) of the electrodeposition bath is inevitably on the weakly acidic side near pH 6.

When such an electrodeposition coating is used in a coating equipment not having corrosion resistance, the electrodeposition tank and associated piping may be corroded. Therefore, in order that a stable coating operation may be insured, it is necessary to provide a special coating equipment using corrosion-resistant materials such as stainless steel or the like material. However, such corrosion-resistant materials are so expensive that the practice of said electrodeposition has an economic disadvantage. Therefore, there has been a demand for development of a cationic electrodeposition coating composition capable of coating with the coating equipment using inexpensive sheet steel.

In order to inhibit corrosion of the electrodeposition tank and associated piping, it can be considered to make the coating bath weakly basic at least. However, when a basic compound such as an amine is added to a cationic electrodeposition coating composition to make it weakly basic, agglomeration and/or precipitation of coating particles will occur to detract from both the storage stability of the coating and/or the bath stability in the electrodeposition tank. This phenomenon is generally accounted for as follows. Thus, because the conventional cationic electrodeposition coating composition is of the proton hydration type such that the tertiary amino group has been neutralized with an acid, the basic substance added for pH adjustment extracts the neutralizing acid from the tertiary amino group. Therefore, it is practically impossible to make a cationic electrodeposition coating composition of the proton hydration type basic.

SUMMARY OF THE PRESENT INVENTION

In the light of the above-mentioned art, the present invention has for its object to provide a basic cationic electrodeposition coating composition which does not detract from either storage stability or bath stability even though it is basic and, does not make the coating equipment such as the electrodeposition tank and associated piping corroded, and a method for producing it.

The present invention is directed to a basic cationic electrodeposition coating composition having a hydrogen ion concentration within the range of 7.5 to 12.0 in terms of hydrogen ion exponent (pH).

The present invention is further directed to a method for producing a basic cationic electrodeposition coating composition which comprises preparing an aprotic hydration functional group-containing resin composition and adding thereto a basic organic compound.

The present invention is now described in detail.

DETAILED DESCRIPTION OF THE PRESENT INVENTION

The basic cationic electrodeposition coating composition of the present invention has a hydrogen ion concentration within the range of 7.5 to 12.0 in terms of hydrogen ion exponent. The relationship of hydrogen ion concentration to pH is expressed by the following equation.

$$pH = -\log[H^+]$$

The pH usually denotes the hydrogen ion exponent of an aqueous solution but as used in this specification, the term pH means the value of a cationic electrodeposition coating composition as measured with a pH meter in the routine manner as if it were an aqueous solution. While the basic cationic electrodeposition coating composition of the present invention is an aqueous solution or water dispersed liquid, the pH measurement of the water dispersed liquid is carried out under constant stirring. In this specification, pH represents the value measured under ordinary conditions.

If the pH of the basic cationic electrodeposition coating composition is less than 7.5, the corrosion of the coating equipment such as the electrodeposition tank and associated piping cannot be so sufficiently inhibited that the effect of the present invention is likely not to be obtained. On the other hand, if the pH exceeds 12.0, the strong basicity causes various troubles. Therefore, the above-mentioned range should be respected. The preferred range is pH 7.8 to 10.0.

In the present invention, it is of great importance that the pH of the cationic electrodeposition coating composition be controlled within the basic region of pH 7.5 to 12.0. Thus, the pH of the electrodeposition bath must not be less than 7.5 in order that the corrosion of the coating equipment such as the electrodeposition tank and the like are successfully precluded. However, it was not conceivable, from the standpoint of storage stability and bath stability of the coating, to make the coating bath basic in the cationic electrodeposition coating composition heretofore in widespread use. In fact, the conventional cationic electrodeposition coatings could not be made basic. The inventors of the present invention discovered that when a resin which is stable in a weakly basic environment is used as the main binder of a cationic electrodeposition coating composition, a sufficiently stable bath for cationic electrodeposition coating can be obtained even through it is weakly basic. The present invention has been developed on the basis of the above finding.

The basic cationic electrodeposition coating composition of the present invention is preferably a composition containing an aprotic hydration functional group-containing component for controlling the hydrogen ion exponent (pH) of the composition in the above-mentioned range. The aprotic hydration functional group mentioned above is a functional group required for insuring an acceptable polymer dispersion stability in water and containing no proton.

The aprotic hydration functional group is not particularly restricted but includes onium salts, for example, such as sulfonium salt, ammonium salt, phosphonium salt, and selenium salt. In consideration of the ease of production, the sulfonium salt and ammonium salt are preferred. Moreover, in consideration of throwing power, the sulfonium salt is more preferred.

The preferred proportion of said aprotic hydration functional group is 10 to 300 millimoles based on 100 grams of resin solids in the basic cationic electrodeposition coating composition. If its proportion is less than 10 millimole/100 g, the desired electrodeposition characteristics cannot be obtained and the bath stability will become also poor. If its proportion exceeds 300 millimole/100 g, no satisfactory electrodeposition on the substrate surface will be obtained. The more preferred proportion is 20 to 100 millimole/100 g.

In the present invention, the component containing said aprotic hydration functional group is a main binder for the basic cationic electrodeposition coating. The main binder mentioned above is not articularly restricted but is preferably a resin obtainable from a polyepoxide containing at least 2 glycidyl groups per molecule so that an aprotic hydration functional group such as an onium salt may be easily introduced into the resin. The polyepoxide mentioned just above is not particularly restricted but includes, for example, epi-bis type of epoxy resin; the resin available upon chain extension of epi-bis type of epoxy resin with a diol, dicarboxylic acid, diamine, or the like; epoxide polybutadiene; novolak phenol type polyepoxy resin; polyglycidyl acrylate; aliphatic polyol or polyether polyol glycidyl ethers; and polybasic carboxylic acid polyglycidyl esters; among others.

The preferred number average molecular weight of said main binder is 250 to 20000. If it is less than 250, the coating efficiency of cationic electrodeposition coating will be poor. If it exceeds 20000, no satisfactory film will be obtained on the substrate surface. The more preferred range is 500 to 5000.

There is no particular limitation on the method for introducing said aprotic hydration functional group into said main binder. For example, the method which comprises reacting a reagent capable of forming an onium salt, such as a sulfide/acid mixture, with the glycidyl group of polyepoxide for the material of the main binder; and the method which comprises polymerizing the main binder with an acrylic monomer having a quaternary ammonium salt can be mentioned.

The sulfide for use in the introduction of said aprotic hydration functional group is not particularly restricted but includes aliphatic sulfides, aliphatic/aromatic sulfides, aralkyl sulfides, and cyclic sulfides.

The addition amount of said aprotic hydration functional group to said main binder can be judiciously selected so that the proportion of the aprotic hydration functional group in the final basic cationic electrodeposition coating composition will fall within the above-specified range.

The basic cationic electrodeposition coating composition of the present invention preferably contains a basic organic compound. The basic organic compound mentioned above is not restricted but includes various amines, for example primary through tertiary monofunctional and polyfunctional amines, alicyclic amines, and aromatic amines. Among those basic organic amines, water-soluble or water-dispersible species are preferred. Specifically, alkylamines having 2 to 8 carbons such as monomethylamine, dimethylamine, trimethylamine, triethylamine, propylamine, diisopropylamine, tributylamine, etc.; monoethanolamine, dimethanolamine, methylethanolamine, dimethylethanolamine, cyclohexylamine, morpholine, N-methylmorpholine, pyridine, pyrazine, piperidine, imidazoline, imidazole, etc. can be mentioned. Those compounds can be used each independently or in a combination of 2 or more species. In the viewpoint of stability of water-dispersing, hydroxylamines such as monoethanolamine, diethanolamine, dimethylethanolamine, etc. are preferred.

The above basic organic compound controls the hydrogen ion concentration of the basic cationic electrodeposition coating composition of the present invention. Therefore, the addition amount of said basic organic compound is judiciously selected so that the pH of the basic cationic electrodeposition coating composition of the present invention will be 7.5 to 12.0.

The basic cationic electrodeposition coating composition of the present invention may contain, in addition to said aprotic hydration functional group-containing component and basic organic compound, such other components as are commonly used in the conventional cationic electrodeposition coating composition. Those other components are not particularly restricted but include a curing agent, pigment, pigment dispersing resin, and catalyst, as well as a variety of coating additives such as a surfactant, antioxidant, and ultraviolet absorber.

The above-mentioned curing agent is not restricted but includes blocked isocyanate compounds and polyunsaturated compounds.

The pigment mentioned above is not restricted but includes the species which are generally used in cationic electrodeposition coating composition, for example colored pigments such as titanium dioxide, carbon black, iron oxide red, etc.; anti-corrotive pigments such as basic lead silicate, aluminum phosphomolybdate, etc.; extenders such as kaolin, clay, talc, etc.

The preferred addition amount of said pigment is 0 to 50 weight % of the basic cationic electrodeposition coating composition on a solids basis.

Regarding the curing functional group in the basic cationic electrodeposition coating composition of the present invention, there is no limitation only provided that the pH may be within the range of 7.5 to 12.0. For example, those curing systems which are used in the conventional cationic electrodeposition coating, such as the unsaturated functional group curing system and the blocked isocyanate curing system, among others, can be used. Among them, the unsaturated functional group curing system are preferred, because which does not give an elimination product and enables sufficient expression of the function of said aprotic hydration functional group.

As the unsaturated functional group curing system mentioned above, the system using a metallocycle reaction, the propargyl/allene curing system and the like can be mentioned. The curing system using the metallocycle reaction can carry out the curing by using a reaction that a compound containing a triple bond, e.g. ethynyl, nitrile, etc., or a double bond is subjected to oxidative addition, reductive elimination, and then cyclization in the presence of a metal catalyst. The propargyl/allene curing system can carry out the curing by using the isomerization of propargyl to allene in the strongly basic environment on the cathode. When a basic cationic electrodeposition coating composition containing an onium salt as said aprotic hydration functional group is deposited on a substrate, the electrolytically formed base available upon the electrode reaction can be used for the isomerization of propargyl to allene. In this sense, the propargyl/allene curing system is preferably used in the practice of the present invention.

The basic cationic electrodeposition coating composition of the present invention can be obtained by, for example, mixing said aprotic hydration functional group-containing component with said basic organic compound optionally together with the other components and dissolving or dispersing the mixture in water. For use in cationic electrodeposition coating, the composition is preferably adjusted to give a bath containing 15 to 25% of nonvolatile matter.

The basic cationic electrodeposition coating composition of the present invention has a weak basicity of pH 7.5 to 12.0 so that it does not cause corrosion of the equipment even if the equipment does not have corrosion resistance. Moreover, since the hydration functional group of the resin is an aprotic hydration functional group, the basic organic compound added in order to have a weak basicity does not cause the agglomeration, thus insuring a good storage stability and a sufficient bath stability. Therefore it is useful for cationic electrodeposition coating.

When the aprotic hydration functional group is the sulfonium salt, for instance, the basic organic compound functions as a nucleophilic agent to promote reduction of the sulfonium salt in the electrodeposition process. This reaction may be written as follows.

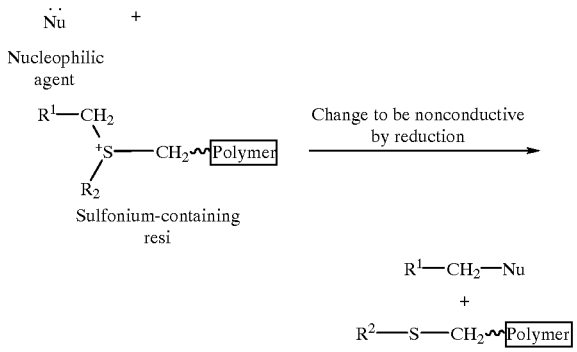

By the above reaction, the electrodeposited film on the substrate surface becomes a nonconductive film, with the result that an improved throwing power is realized. Therefore, the basic cationic electrodeposition coating composition of the present invention contributes a great deal to the appearance and corrosion resistance of the obtained film, too.

The method for producing a basic cationic electrodeposition coating composition of the present invention comprises preparing a resin composition containing aprotic hydration functional groups and then adding thereto a basic organic compound. The "addition of a basic organic compound" as the term is used in this specification covers the mode of use of the basic organic compound as a component of said resin composition as well.

The above-mentioned resin composition containing aprotic hydration functional groups can be provided by mixing said aprotic hydration function group-containing main binder, optionally together with a curing agent, pigment, pigment dispersing resin, catalyst, and other additives, to disperse in water. It is known that a resin composition which is obtained in this manner is weakly acidic.

The main binder containing the aprotic hydration functional group is not restricted but includes the resins mentioned hereinbefore for the component containing aprotic hydration functional groups.

In accordance with the present invention, a basic cationic electrodeposition coating composition is provided by adding said basic organic compound to said resin composition. As an alternative, a basic cationic electrodeposition coating composition can be produced by adding said basic organic compound to water for use as a dispersing medium for mixing the components of said resin composition to disperse.

The basic organic compound is not restricted but includes the compounds mentioned hereinbefore.

The basic cationic electrodeposition coating composition thus obtained can be adjusted for solids concentration and used in cationic electrodeposition coating in the same manner as the ordinary cationic electrodeposition coating.

The basic cationic electrodeposition coating composition of the present invention shows a weak basicity of pH 7.5 to 12.0 owing to the presence of said basic organic compound. Therefore, unlike the conventional weakly acidic cationic electrodeposition coating composition, it is not essential to design an equipment using an expensive corrosion-resistant materials. Rather, inexpensive materials such as sheet steel can be used for the construction of the equipment. Thus, the present invention contributes to cost reductions in the installation of a new coating line or the remodeling of the existing line. Moreover, the existing coating line can be used as it is and even then an extended life expectancy of the equipment can be implemented as compared with the case in which the conventional weakly acidic cationic electrodeposition coating composition is used.

EXAMPLES

The following examples illustrate the present invention in further detail without delimiting the scope of the present invention.

Production Example 1
Production of a Sulfonium Salt-containing Resin

A separable flask fitted with a stirrer, thermometer, nitrogen gas inlet line, and reflux condenser was charged with 1663.5 g of a cresol novolak type epoxy resin having an epoxy equivalent of 200.4 (EPO-TOHTO YDCN-701, Tohto Kasei), 510.5 g of propargyl alcohol, and 5.0 g of dimethylbenzylamine. The temperature was then increased to 125° C. and the reaction was conducted for 3 hours to give a propargyl group-containing resin with an epoxy equivalent of 1580.

Then, a separable flask fitted with a stirrer, thermometer, nitrogen gas inlet line, and a reflux condenser was charged with 1089.5 g of the above propargyl group-containing resin, 99.0 g of 1-(2-hydroxyethylthio)-2,3-propanediol, 39.0 g of glacial acetic acid, and 93.5 g of deionized water. The temperature was increased to 75° C. and the reaction was conducted for 6 hours. Then, 286.0 g of deionized water was added to the reaction mixture to provide a sulfonium salt-containing resin solution (A). This resin solution (A) had a solids concentration of 70.0% and a sulfonium value of 33 mmol/100 g resin solids.

Production Example 2
Production of an Ammonium Salt-containing Resin

A separable flask fitted with a stirrer, thermometer, nitrogen gas inlet line, and reflux condenser was charged with 1663.5 g of a cresol novolak type epoxy resin having an epoxy equivalent of 200.4 (EPO-TOHTO YDCN-701, Tohto Kasei), 510.5 g of propargyl alcohol, and 5.0 g of dimethylbenzylamine. The temperature was then increased to 125° C. and the reaction was conducted for 3 hours to give a propargyl group-containing resin with an epoxy equivalent of 1580.

Then, a separable flask fitted with a stirrer, thermometer, nitrogen gas inlet line, and a reflux condenser was charged with 1089.5 g of the above propargyl group-containing resin, 64.7 g of dimethylaminoethanol, 39.0 g of glacial acetic acid, and 93.5 g of deionized water. The temperature was increased to 75° C. and the reaction was conducted for 6 hours. Then, 286.0 g of deionized water was added to the reaction mixture to provide an ammonium salt-containing resin solution (B). This resin solution (B) had a solids concentration of 69.3% and an ammonium value of 37 mmol/100 g resin solids.

Comparative Production Example 1

A separable flask fitted with a stirrer, thermometer, nitrogen gas inlet line, and reflux condenser was charged with 1900.0 g of a bisphenol type epoxy resin having an epoxy equivalent of 950 (Epikote 1004, Yuka Shell Epoxy) which is available upon reaction of bisphenol A with epichlorohydrin in the presence of an alkaline catalyst. After the resin was dissolved in 993 g of ethylene glycol monobutyl ether, 210 g of diethanolamine was added dropwise at a constant temperature of 90° C. After completion of dropwise addition, the temperature was increased to 110° C. and the reaction was conducted for 90 minutes to give a resin solution with a solids concentration of 68%.

To this resin was added the curing agent ethylene glycol mono-2-ethylhexyl ether-blocked diphenylmethane diisocyanate in a weight ratio of (resin solution)/(curing agent)= 75/25, followed by addition of 3 weight % of dibutyltin oxide. This resin composition, 1389 g (75% solids), was added to a mixed aqueous solution consisting of 672 g of deionized water and 21 g of glacial acetic acid and the mixture was stirred using a high-speed rotary mixer for 1 hour. Then, 1381.5 g of deionized water was further added to the mixture to give an aqueous solution with a solids concentration of 30 weight % for use as a reference emulsion.

Example 1
Preparation of a Cationic Electrodeposition Coating

To 1142.9 g of the resin solution (A) obtained in Production Example 1 was added 8.0 g of nickel acetylacetonate, and the mixture was agitated using a high-speed rotary mixer for 90 minutes. Then, 4193.1 g of deionized water was added to the mixture to give an aqueous solution with a solids concentration of 15 weight %. Thereafter, 26.7 g of a 20% aqueous solution of dimethylaminoethanol was added to the above solution to provide a cationic electrodeposition coating (1).

Comparative Example 1

Except that the 20% aqueous solution of dimethylaminoethanol was not added, the procedure of Example 1 was otherwise repeated to provide a cationic electrodeposition coating (2).

Example 2

To 1154.4 g of the resin solution (B) obtained in Production Example 2 was added 8.0 g of nickel acetylacetonate, and the mixture was agitated with a high-speed rotary mixer for 90 minutes. Then, 4181.6 g of deionized water was added to the mixture to prepare an aqueous solution with a solids concentration of 15 weight %. Then, 26.7 g of a 20% aqueous solution of dimethylaminoethanol was added. under constant stirring to provide a cationic electrodeposition coating (3).

Comparative Example 2

Except that the 20% aqueous solution of dimethylaminoethanol was not added, the procedure of Example 2 was otherwise repeated to provide a cationic electrodeposition coating (4).

Comparative Example 3

To 2672 g of the reference emulsion obtained in Comparative Production Example 1 was added 2672 g of deionized water under constant stirring to give an aqueous solution with a solids concentration of 15 weight %. Then, 26.7 g of a 20% aqueous solution of dimethylaminoethanol was added under stirring, whereupon agglomeration and phase separation occurred, failing to provide an electrodeposition coating.

Comparative Example 4

Except that the 20% aqueous solution of dimethylaminoethanol was not added, the procedure of Comparative Example 3 was otherwise repeated to provide a cationic electrodeposition coating (5).

With each of the electrodeposition coating obtained in Examples 1 and 2, Comparative Examples 1, 2, and 4, the pH of the electrodeposition bath was measured to evaluate the anti-corrosion effect for equipment and bath stability against agglomeration. The following measurement method and evaluation schedules were used.

Measurement of Bath pH

The pH of each cationic electrodeposition coating was measured with a pH meter (HM-40S, Toa Dempa Kogyo) and the 25° C. equivalent value was calculated. The results are shown in Table 1.

Evaluation of Equipment Corrosion-sparing Effect

A 4-L paint can with a resin-coated inside wall was filled with each cationic electrodeposition coating and allowed to stand at 40° C. for 4 weeks. Thereafter, the degree of rust formation in the marginal area of the can wall (uncoated area) was evaluated. The results are shown in Table 1.

○: no rust formation

Δ: slight rust formation

X: marked rust formation

Evaluation of Stability against Agglomeration

Each cationlc electrodeposition coating which had been allowed to stand at 40° C. for 4 weeks was sampled into a 200 ml measuring cylinder. The cylinder was then left standing for 48 hours and the incidence of agglomeration was visually evaluated. The results are shown in Table 1.

○: no precipitation or phase separation

X: agglomeration occurs upon addition of the amine compound

TABLE 1

|  |  | Example 1 | Example 2 | Comparative Example 1 | Comparative Example 2 | Comparative Example 3 | Comparative Example 4 |
|---|---|---|---|---|---|---|---|
| Paint Formula | Free amine added | Dimethyl-aminoethanol | Dimethyl-aminoethanol | — | — | Dimethyl-aminoethanol | — |
|  | Cataionic hydration functional group | Tertiary sulfonium salt | Quaternary ammonium salt | Tertiary sulfonium salt | Quaternary ammonium salt | Neutralized with tertiary amine | Neutralized with tertiary amine |
| Bath pH |  | 9.7 | 10.2 | 5.4 | 6.9 | — | 6.1 |
| Anti-corrosion effect for equipment |  | ○ | ○ | X | Δ | — | X |
| Stability against agglomeration |  | ○ | ○ | ○ | ○ | X | ○ |

EFFECT OF THE INVENTION

The basic cationic electrodeposition coating composition of the present invention as described above enables cationic electrodeposition coating in the basic condition and features a good storage stability as well as acceptable bath stability so that it can be used with advantage for cationic electrodeposition coating without the risk for corrosion of the electrodepositlon tank, circulation pipeline, heat exchanger and other equipment.

The method of producing a basic catlonic electrodeposition coating composition according to the present invention enables production of said basic cationic electrodeposition coating composition of the present invention in a very expedient way so that it is quite suited for the production of basic cationic electrodeposition coating compositions.

What is claimed is:

1. A basic cationic electrodeposition coating composition having a hydrogen ion concentration within the range of 7.5 to 12.0 in terms of hydrogen ion exponent (pH), which contains an aprotic hydration functional group-containing component and contains a basic organic compound, wherein the aprotic hydration functional group is a sulfonium salt, and wherein a metallocycle reaction or a propargyl/allene curing system is used as the curing system and wherein the basic organic compound is a basic organic compound for controlling a pH of the composition.

2. The basic cationic electrodeposition coating composition according to claim 1 wherein the basic organic compound is an amine compound.

3. The basic cationic electrodeposition coating composition according to claim 1 wherein the basic organic compound is a primary through tertiary monofunctional or polyfunctional amine, an alicyclic amine, or an aromatic amine or mixtures thereof.

4. The basic cationic electrodeposition coating composition according to claim 1 wherein the basic organic compound is an alkylamine having 2 to 8 carbons, a hydroxylamine, or mixtures thereof.

5. The basic cationic electrodeposition coating composition of claim 1 wherein the basic organic compound is at least one member selected from the group consisting of monomethylamine, dimethylamine, trimethylamine, triethylamine, propylamine, diisopropylamine, tributylamine, monoethanolamine, dimethanolamine, methylethanolamine, dimethylethanolamine, cyclohexylamine, morpholine, N-methylmorpholine, pyridine, pyrazine, piperidine, imidazoline and imidazole.

6. The basic cationic electrodeposition coating composition of claim 1 wherein the basic organic compound is at least one member selected from the group consisting of monoethanolamine, diethanolamine and dimethylethanolamine.

7. A method for producing a basic cationic electrodeposition coating composition which comprises preparing an aprotic hydration functional group-containing resin composition and adding a basic organic compound, wherein the aprotic hydration functional group is a sulfonium salt, and wherein a metallocycle reaction or a propargyl/allene curing system is used as the curing system and wherein the basic organic compound is a basic organic compound for controlling a pH of the composition.

8. The method for producing a basic cationic electrodeposition coating composition according to claim 7 wherein the basic organic compound is an amine compound.

9. A process of curing a basic cationic electrodeposition coating composition having a hydrogen ion concentration within the range of 7.5 to 12.0 in terms of hydrogen ion exponent (pH) and containing an aprotic hydration functional group-containing component wherein the aprotic hydration functional group is an onium salt, which comprises use of a metallocycle reaction or a propargyl/allene curing system.

10. The process of curing a basic cationic electrodeposition coating composition according to claim 9, wherein the basic cationic electrodeposition coating composition further contains a basic organic compound.

11. The process of curing a basic cationic electrodeposition coating composition according to claim 9, wherein the onium salt is a sulfonium salt.

* * * * *